United States Patent
Kim et al.

(10) Patent No.: US 6,713,784 B2
(45) Date of Patent: Mar. 30, 2004

(54) HOMOGENEOUS ELECTRIC FIELD LIQUID CRYSTAL DISPLAY

(75) Inventors: Hyang Yul Kim, Kyoungki-do (KR); In Cheol Park, Seoul (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 258 days.

(21) Appl. No.: 09/783,243

(22) Filed: Feb. 12, 2001

(65) Prior Publication Data

US 2001/0024258 A1 Sep. 27, 2001

Related U.S. Application Data (63) Continuation of application No. 09/351,828, filed on Jul. 12, 1999, now abandoned.

(30) Foreign Application Priority Data

Jul. 20, 1998 (KR) .............................. 98-29073

(51) Int. Cl.[7] .................. H01L 29/04; H01L 31/20; H01L 31/036; H01L 31/0376
(52) U.S. Cl. ....................... 257/59; 257/72; 257/632
(58) Field of Search .................. 257/59, 72, 632

(56) References Cited

U.S. PATENT DOCUMENTS

| 5,353,142 A | 10/1994 | Dodd |
|---|---|---|
| 5,447,882 A | 9/1995 | Kim |
| 5,461,369 A | 10/1995 | Campbell et al. |
| 5,471,364 A | 11/1995 | Summerfelt et al. |
| 5,534,722 A | 7/1996 | Takasu et al. |
| 5,668,032 A | 9/1997 | Holmberg et al. |
| 6,175,393 B1 * | 1/2001 | Ban et al. ............ 349/39 |

FOREIGN PATENT DOCUMENTS

| JP | 773991 | 3/1995 |
|---|---|---|
| JP | 9257606 | 10/1997 |

OTHER PUBLICATIONS

Leon I. Maissel and Reinhard Glang, "Handbook of Thin Film Technology", Table 6, p. 6–12 (1970).

* cited by examiner

*Primary Examiner*—Ngân V. Ngô
(74) *Attorney, Agent, or Firm*—Selitto, Behr & Kim

(57) ABSTRACT

Disclosed is an in-plane switching(IPS) mode liquid crystal display(LCD) to prevent generating parasitic electric field due to residual DC components and static electricity. The IPS mode LCD according to the present invention comprises a first substrate; counter electrodes formed on the first substrate; pixel electrodes formed on the first substrate and spaced apart from the counter electrodes; a first high dielectric layer formed between the counter and pixel electrodes on the first substrate in which the counter and pixel electrodes are formed; a second substrate opposed to the first substrate; and a second high dielectric layer disposed at an inner surface of the second substrate.

23 Claims, 8 Drawing Sheets

HOMOGENEOUS ELECTRIC FIELD LIQUID CRYSTAL DISPLAY

CROSS REFERENCE TO RELATED APPLICATION

This application is a continuation of U.S. patent appln. Ser. No. 09/351,828 filed Jul. 12, 1999, now abandoned.

FIELD OF THE INVENTION

The present invention relates to a liquid crystal display (LCD), more particularly to a homogeneous electric field LCD capable of preventing generating parasitic electric field.

BACKGROUND OF THE INVENTION

The in-plane switching(IPS) mode LCD of the homogeneous electric field has been suggested to replace the twisted nematic (TN) mode LCD so that the viewing angle characteristic is improved.(Principle and characteristic of electro-optical behaviour with in-plane switching mode, Asia Display 95, p. 577~580)

Figure 1:
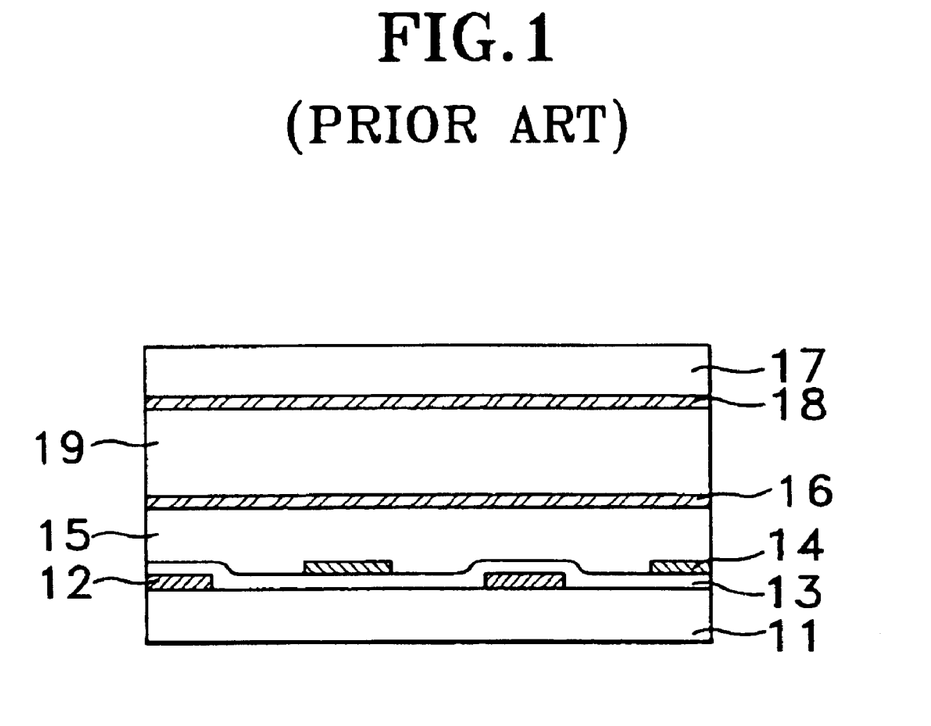
FIG. 1 is a cross-sectional view showing a conventional IPS mode LCD.

FIG. 1 is a cross-sectional view showing a conventional IPS mode LCD.

A counter electrode 12 is disposed on a lower substrate 11. An insulating layer 13 is disposed on the lower substrate in which the counter electrode 12 is formed. A pixel electrode 14 is sandwiched between the counter electrodes 12 on the insulating layer 13. A passivation layer 15 and a first alignment layer 16 are formed in series on the lower substrate in which the pixel electrode 14 and the counter electrode 12 are formed.

An upper substrate 17 is opposed to the lower substrate with a selected distance. A second alignment layer 18 is formed on an inner surface of the upper substrate 17. A liquid crystal layer 19 is sandwiched between the upper substrate 17 and the lower substrate 11.

However, there are generated residual DC components and static electricity in the IPS mode LCD. Therefore afterimages are shown in the LCD.

That is to say, driving electric power of the LCD is AC components and driving velocity is about several tens $\mu$s. On the other hand, liquid crystal molecule of the LCD device have reaction velocity of several ms. Accordingly, when the LCD is driven by providing the AC power, the liquid crystal molecules in the liquid crystal layer 19 do not react to the frequency of the driving electric power but change their polarities. Therefore, a DC due to a DC power is generated between the counter electrode 12 and the pixel electrode 14. To remove the DC, voltage of the counter electrode 12 is offset. However, this offsetting of the counter electrode voltage can not remove the DC components between the counter and pixel electrodes completely. Also, the residual DC components are accumulated in proportion to time.

After a lapse of time, particles having negative electric charge among contaminants in the liquid crystal layer 19 gather around the residual DC component having positive electric charge. As a result, there is generated a parasitic electric field between the residual DC component and the contaminants of the liquid crystal layer 19. The parasitic electric field offsets by a main electric field being formed between the counter electrode 12 and the pixel electrode 14, and then the liquid crystal molecules drive in an abnormal state. Furthermore, the voltage holding ratio in the liquid crystal layer 19 is degraded and causes afterimages on the screen. Also, the residual DC components reduce effective voltage of the LCD thereby deteriorating response time characteristic of the LCD.

Moreover, there is attached to a surface of an analyzer a protection film for protecting screen of finished product. This protection film should be peeled off when a consumer uses the LCD device. At this time, there is generated static electricity by charging between the protection film and the analyzer momentarily.

As described, the static electricity is generally discharged by electrodes provided within the LCD cells. However, there is no electrode at an upper substrate of the IPS mode LCD, and accordingly it is not easy to discharge the static electricity and the static electricity remains in the upper substrate.

In that case, a parasitic electric field is formed between the residual static electricity in the upper substrate and electrodes of a lower substrate, thereby deteriorating the display characteristic of the LCD.

SUMMARY OF THE INVENTION

Accordingly, it is one object of the present invention to prevent generating of parasitic electric field due to the residual DC.

It is further object of the present invention to prevent generating parasitic electric field due to the residual static electricity in the upper substrate.

It is still object of the present invention to improve response time of the LCD.

To accomplish foregoing objects, the present invention provides an LCD comprising: a substrate; counter electrodes formed on the substrate; pixel electrodes formed on the substrate and spaced apart from the counter electrodes; and a high dielectric layer disposed between the counter and pixel electrodes on the substrate in which the counter and pixel electrodes are formed.

Herein, both sides of the high dielectric layer are overlapped with the counter electrodes and the pixel electrodes respectively, otherwise the high dielectric layer is overlapped with the counter electrodes and the pixel electrodes entirely.

The present invention further provides an LCD comprising: a first substrate; counter electrodes formed on the first substrate; pixel electrodes formed on the first substrate and spaced apart from the counter electrodes; a second substrate opposed to the first substrate; and a high dielectric layer disposed at an inner face of the second substrate.

Herein, the high dielectric layer is disposed over the second substrate, or the high dielectric layer is formed at a region to correspond with a region between the counter and pixel electrodes, otherwise the high dielectric layer is formed at a region to correspond with the counter and pixel electrodes.

The present invention still provides an LCD comprising: a first substrate; counter electrodes formed on the first substrate; pixel electrodes formed on the first substrate and spaced apart from the counter electrodes; a first high dielectric layer formed between the counter and pixel electrodes on the first substrate in which the counter and pixel electrodes are formed; a second substrate opposed to the first substrate; and a second high dielectric layer disposed at an inner surface of the second substrate.

Herein, the high dielectric layers have a dielectric constant of over 8, and more preferably the high dielectric layers have a dielectric constant of $10^6$ approximately.

According to the present invention, the high dielectric layer having dielectric constant of over 8 is sandwiched between the substrate in which the counter and pixel electrodes are formed and the alignment layer, thereby reducing the residual DC between the counter and pixel electrodes. As a result, no parasitic electric field is formed in the liquid crystal layer and the voltage holding ratio and response time characteristic are also improved. Further, since the parasitic electric field is prevented, the liquid crystal molecules do not drive in the abnormal state. Consequently, wide viewing angle and enhance transmittance are obtainable.

Further, the static electricity in the upper substrate is discharged rapidly since the high dielectric layer is formed on the upper substrate opposite to the lower substrate in which the counter and pixel electrodes are formed.

DETAILED DESCRIPTION OF THE PREFERRED EMBODIMENTS

First Embodiment

LCD to Prevent Generating Parasitic Electric Field Due to Residual DC

Figure 2A:
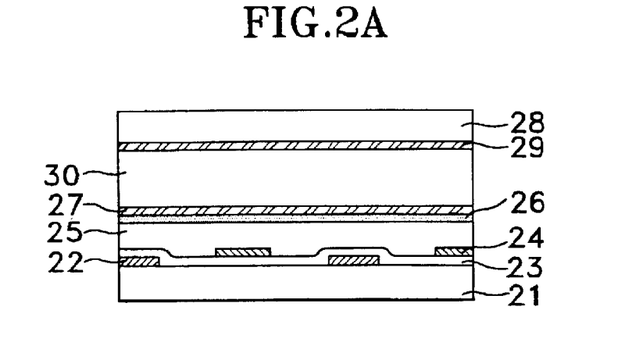
FIG. 2A is a cross-sectional view showing an IPS mode LCD according to a first embodiment of the present invention.

Referring to FIG. 2A, counter electrodes 22 are disposed with a selected distance at an inner surface of a lower substrate 21. A gate insulating layer 23 is deposited on the lower substrate 21 in which the counter electrodes 22 are formed. Pixel electrodes 24 are disposed on the gate insulating layer 23 between the counter electrodes 22. A passivation film 25 is formed on the pixel electrodes 24 and the gate insulating layer 23. Herein, the passivation film 25 can be made of an $SiN_4$ layer. A high dielectric layer 26 is formed over the passivation film 25. The high dielectric layer 26 has a dielectric constant of over 8. Examples of materials having a dielectric constant greater than 8 for use as a high dielectric layer of the present invention are illustrated in U.S. Pat. Nos. 5,447,882 and 5,471,364 and Table 6 of Leon I. Maissel and Reinhard Glang, *Handbook of Thin Film Technology* (1970). An alignment layer 27 is formed on the high dielectric layer 26.

An upper substrate 28 is opposed to the lower substrate 21 with a selected distance. Another alignment layer 29 is formed at an inner surface of the upper substrate 28.

A liquid crystal layer 30 is sandwiched between the lower substrate 21 and the upper substrate 28.

Operation of the LCD having above constitution is as follows.

Intensity of an electric field being formed at a region filled with a dielectric material is generally in the inverse proportion to the dielectric constant K of the dielectric material. The dielectric layer 26 having high dielectric constant is disposed between the counter electrodes 22 and the pixel electrodes 24, and in upper portions thereof. As a result, the intensity of parasitic dielectric field between the residual DC components of the counter and pixel electrodes 22, 24 and contaminants of the liquid crystal molecules, is reduced.

Herein, the greater the dielectric constant K is, the less the parasitic electric field are formed in the LCD. Therefore, the voltage holding ratio is raised and consequently the response time is enhanced and no afterimages are shown in the screen.

Figure 2B:
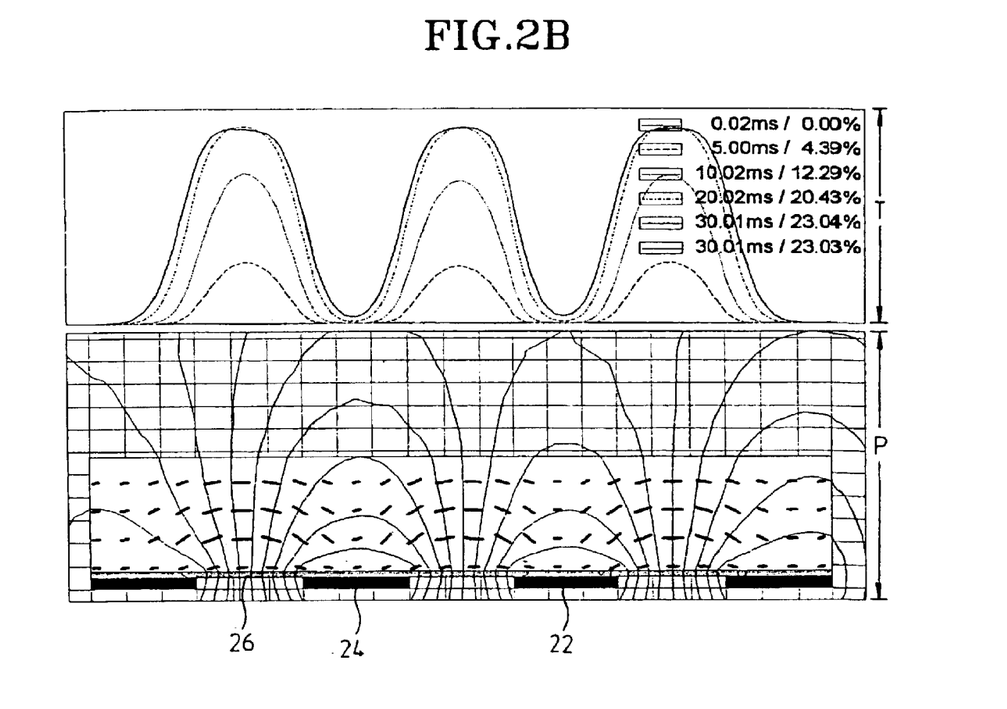
FIG. 2B is a simulation result of the IPS mode LCD according to the first embodiment.

FIG. 2B is a simulation result of the IPS mode LCD according to the first embodiment of the present invention. At this time, the high dielectric layer 26 has the dielectric constant of $10^6$. A reference symbol "T" in the drawing stands for the transmittance of the LCD and "P" stands for a section of the LCD.

According to FIG. 2B, since the parasitic electric field is removed by the high dielectric layer 26 being formed on the lower substrate 21, the liquid crystal molecules are arranged between the counter electrode 22 and the pixel electrode 23 such that long axes of the liquid crystal molecules are disposed parallel to the substrates. That means, the liquid crystal molecules are driven in the normal state not affected by the parasitic electric field but affected by the main electric field thereby preventing defects in the picture quality.

Second Embodiment

LCD to Prevent Generating Parasitic Electric Field Due to the Residual DC

Figure 3A:
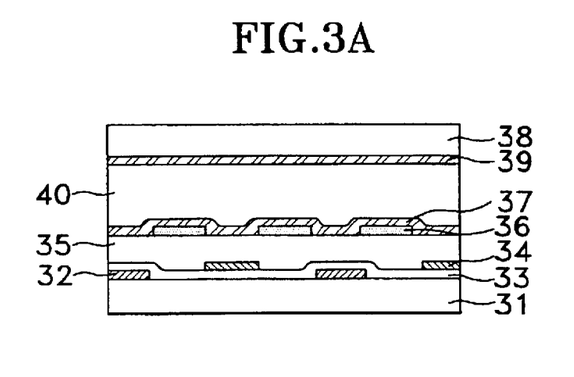
FIG. 3A is a cross-sectional view showing an IPS mode LCD according to a second embodiment of the present invention.

Referring to FIG. 3A, counter electrodes 32 are disposed with a selected distance at an inner surface of a lower substrate 31. A gate insulating layer 33 is deposited on the lower substrate 33 in which the counter electrodes 32 are formed. Pixel electrodes 34 are formed on the gate insulating layer 33 between the counter electrodes 32. A passivation film 35 is formed on the pixel electrodes 34 and on the gate insulating layer 33. A high dielectric layer 36 is formed on the passivation film 35 between the counter and pixel electrodes 32,34. The high dielectric layer 36 has a dielectric constant of over 8. An alignment layer 37 is formed on the high dielectric layer 36 and the passivation film 35.

An upper substrate 38 is opposed to the lower substrate 31 with a selected distance. Another alignment layer 37 is formed at an inner surface of the upper substrate.

A liquid crystal layer 40 is sandwiched between the lower substrate 31 and the upper substrate 38.

Herein, since the high dielectric layer 36 in which the residual DC components are substantially remained, is formed only between the counter and pixel electrodes 32,34. The parasitic electric field generated between the residual DC component and the contaminants of the liquid crystal layer 40 is weakened effectively.

Figure 3B:
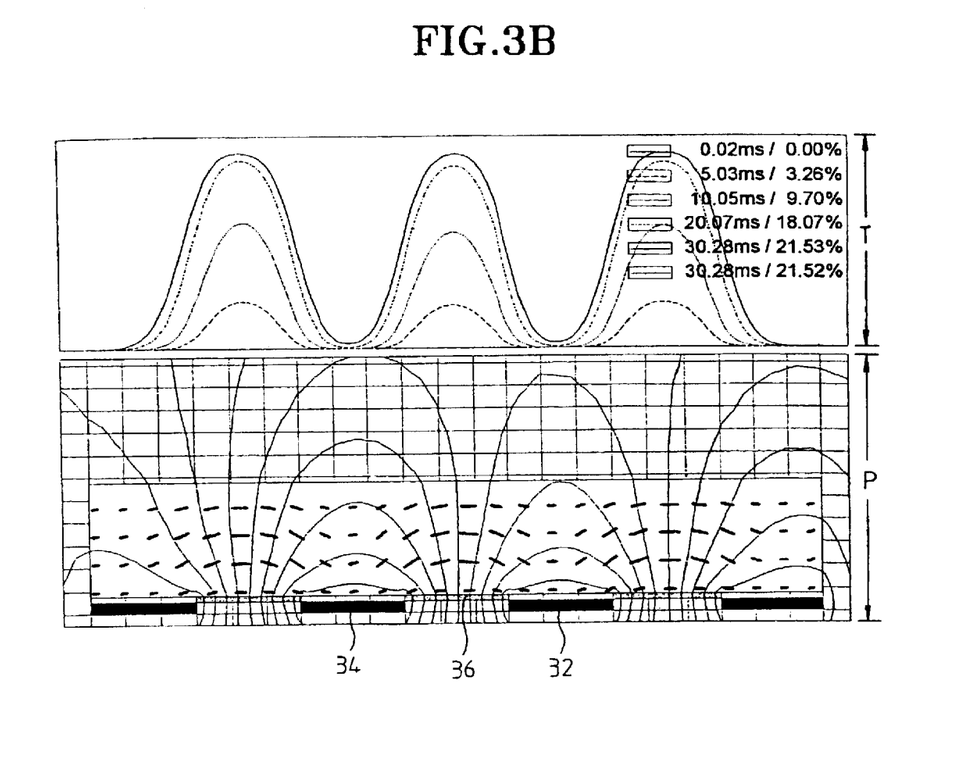
FIG. 3B is a simulation result of the IPS mode LCD according to the second embodiment.

Further, FIG. 3B is a simulation result of the LCD according to the second embodiment of the present invention. The high dielectric layer 36 has the dielectric constant of $10^6$. Similar to FIG. 2B, a reference symbol "T" in the drawing stands for the transmittance of the LCD and "P" stands for a section of the LCD.

According to FIG. 3B, since the parasitic electric field is removed by the high dielectric layer 36 being formed between the counter and pixel electrodes 32,34, the liquid crystal molecules are arranged between the counter electrode 32 and the pixel electrode 34 such that long axes of the liquid crystal molecules are disposed parallel to the substrates. That means, the liquid crystal molecules are driven in the normal state not affected by the parasitic electric field but affected by the main electric field thereby preventing defects in the picture quality.

Third Embodiment

LCD to Prevent Generating Parasitic Electric Field Due to Residual DC

Figure 4A:
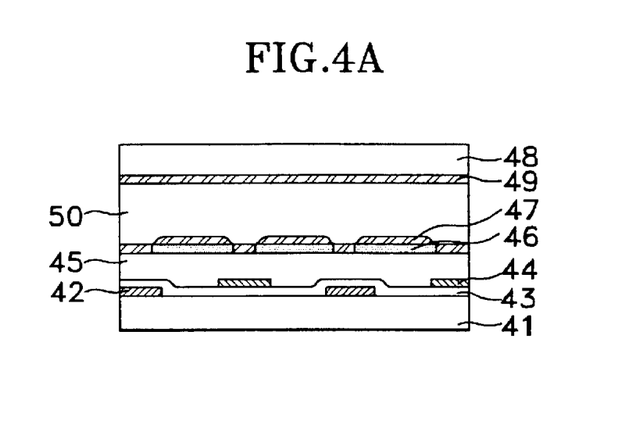
FIG. 4A is a cross-sectional view showing an IPS mode LCD according to a third embodiment of the present invention.

Referring FIG. 4A, counter electrodes 42 are disposed with a selected distance at an inner surface of a lower substrate 41. A gate insulating layer 43 is deposited on the lower substrate 41 in which the counter electrodes 42 are formed. Pixel electrodes 44 are formed on the gate insulating layer 43 between the counter electrodes 42. A passivation film 45 is formed on the pixel electrodes 44 and the gate insulating layer 43. A high dielectric layer 46 is formed on the passivation film 45 between the counter and pixel electrodes 42,44, more preferably both sides of the high dielectric layer 46 are overlapped with the counter electrodes 42 and the pixel electrodes 44 respectively. The high dielectric layer 46 has a dielectric constant of over 8. An alignment layer 47 is formed on the high dielectric layer 46 and the passivation film 45.

An upper substrate 48 is opposed to the lower substrate 41 with a selected distance. Another alignment layer 49 is formed at an inner surface of the upper substrate 48.

A liquid crystal layer 50 is sandwiched between the lower substrate 41 and the upper substrate 48.

While both sides of the high dielectric layer 46 are overlapped with the counter electrodes 42 and the pixel electrodes 44 respectively, and the high dielectric layer 46 is formed on the passivation film 45 between the counter electrodes 42 and the pixel electrodes 44, the same operation as in the first embodiment of the present invention is performed.

Figure 4B:
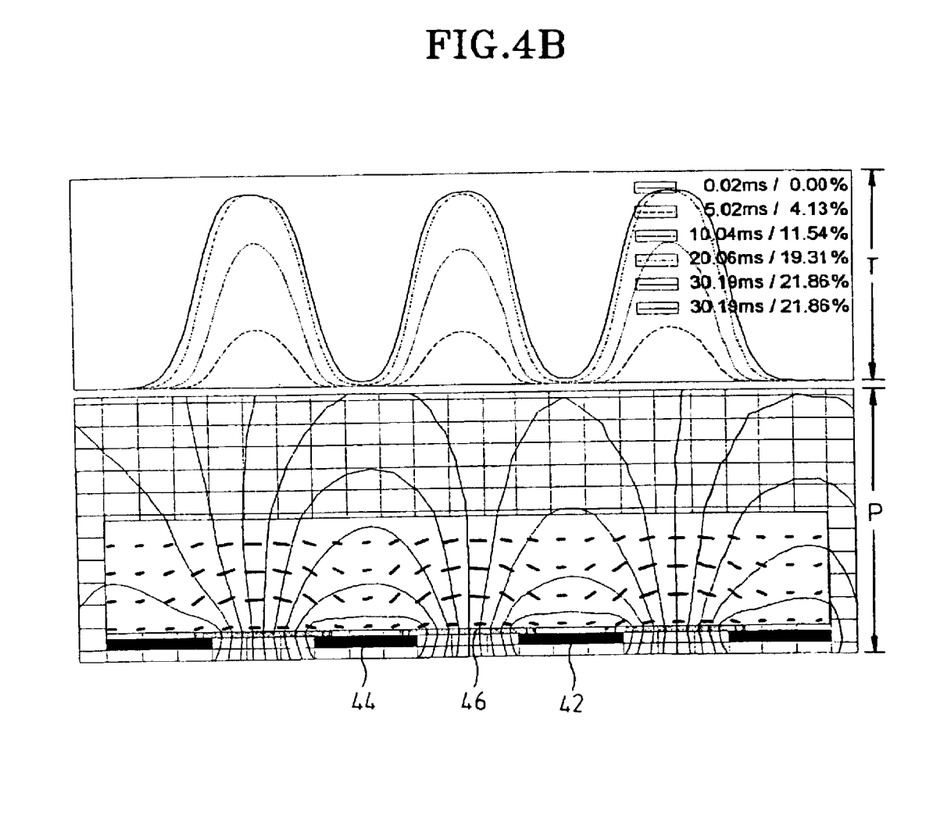
FIG. 4B is a simulation result of the IPS mode LCD according to the third embodiment.

Further, FIG. 4B is a simulation result of the LCD according to the third embodiment of the present invention. The high dielectric layer 46 has the dielectric constant of $10^6$. Similar to FIG. 2B, a reference symbol "T" in the drawing stands for the transmittance of the LCD and "P" stands for a section of the LCD.

According to FIG. 4B, since the parasitic electric field is removed by the high dielectric layer 46 being formed between the counter and pixel electrodes 42,44, the liquid crystal molecules are arranged between the counter electrode 42 and the pixel electrode 44 such that long axes of the liquid crystal molecules are disposed parallel to the substrates. That means, the liquid crystal molecules are driven in the normal state not affected by the parasitic electric field but affected by the main electric field thereby preventing defects in the picture quality.

Fourth Embodiment

Figure 5A:
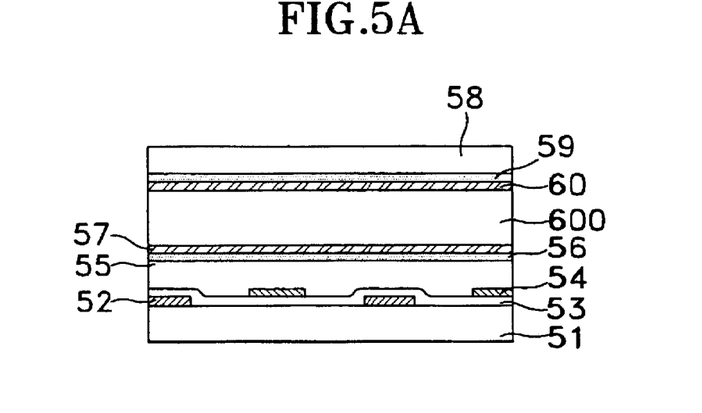
FIG. 5A is a cross-sectional view showing an IPS mode LCD according to a fourth embodiment of the present invention.

LCD to Prevent Generating Parasitic Electric Field Due to Residual DC and Static Electricity Referring to FIG. 5A, counter electrodes 52 are formed on a lower substrate 51. A gate insulating layer 53 is deposited on the lower substrate 51 in which the counter electrodes 52 are formed. Pixel electrodes 54 are formed on the gate insulating layer 53 between the counter electrodes 52. A passivation film 55 is formed on the pixel electrodes and the insulating layer 53. Herein, the passivation film 55 can be made of $SiN_4$ layer. A first high dielectric layer 56 is formed on the passivation film 55 and an alignment layer 57 is formed on the first high dielectric layer 56.

An upper substrate 58 is opposed to the lower substrate 51 with a selected distance. A second high dielectric layer 59 is disposed at an inner surface of the upper substrate 58 and another alignment layer 60 is formed in the second high dielectric layer 59.

A liquid crystal layer 600 is sandwiched between the lower substrate 51 and the upper substrate 58.

Operation of the LCD having the above constitution is as follows.

The first high dielectric layer 56 formed on the lower substrate 51 weakens the parasitic electric field generated between the residual DC component remained between the counter and pixel electrodes 52,53, and the contaminants of the liquid crystal layer 40, and further the second high dielectric layer 59 discharges the static electricity.

Consequently, generating of parasitic electric field is prevented thereby raising the voltage holding ratio. As a result, afterimages in the screen is removed and response time is enhanced.

Furthermore, by removing the static electricity in the upper substrate 58, the parasitic electric field is also removed thereby improving picture quality.

Figure 5B:
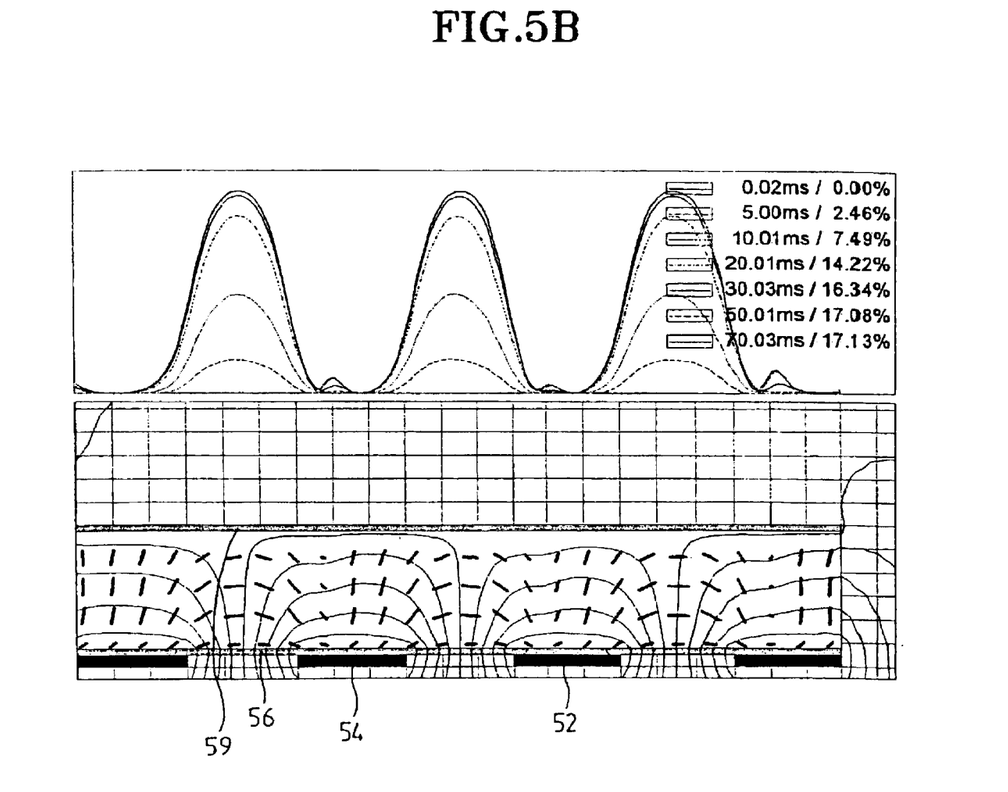
FIG. 5B is a simulation result of the IPS mode LCD according to the fourth embodiment.

FIG. 5B is a simulation result of the LCD according to the fourth embodiment of the present invention. Herein, the high dielectric layers have the dielectric constant of $10^6$. A reference symbol "T" in the drawing stands for the transmittance of the LCD and "P" stands for a section of the LCD.

According to FIG. 5B, since the parasitic electric field is removed by the first and second high dielectric layers 56, 59, the liquid crystal molecules are arranged between the counter electrode 52 and the pixel electrode 54 such that long axes of the liquid crystal molecules are disposed parallel to the substrates. That means, the liquid crystal molecules are driven in the normal state not affected by the parasitic electric field but affected by the main electric field thereby preventing defects in the picture quality.

Fifth Embodiment

LCD to Prevent Generating of Parasitic Electric Field Due to Static Electricity

Figure 6A:
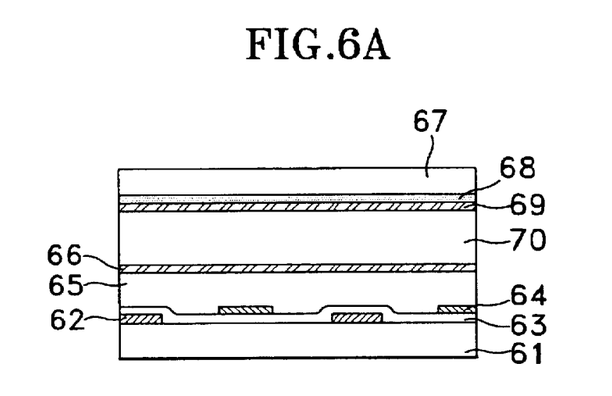
FIG. 6A is a cross-sectional view showing an IPS mode LCD according to a fifth embodiment of the present invention.

Referring to FIG. 6A, counter electrodes 62 are formed on a lower substrate 61. A gate insulating layer 63 is deposited on the lower substrate 61 in which the counter electrodes 62 are formed. Pixel electrodes 64 are formed on the gate insulating layer 63 between the counter electrodes 62. A passivation film 65 is formed on the pixel electrodes 64 and the insulating layer 63. Herein, the passivation film 65 can be made of $SiN_4$ layer. An alignment layer 66 is formed on the passivation film 65.

An upper substrate 67 is opposed to the lower substrate 61 with a selected distance. A high dielectric layer 68 is disposed at an inner surface of the upper substrate 67 and another alignment layer 69 is formed on the high dielectric layer 68.

A liquid crystal layer 70 is sandwiched between the lower substrate 61 and the upper substrate 67.

Operation of the LCD having the above constitution is as follows.

The high dielectric layer 68 is sandwiched between the upper substrate 67 and the alignment layer 69 thereby discharging the static electricity being generated in the upper substrate 67 easily.

Consequently, generating of parasitic electric field is prevented and enhanced picture quality is obtainable.

Figure 6B:
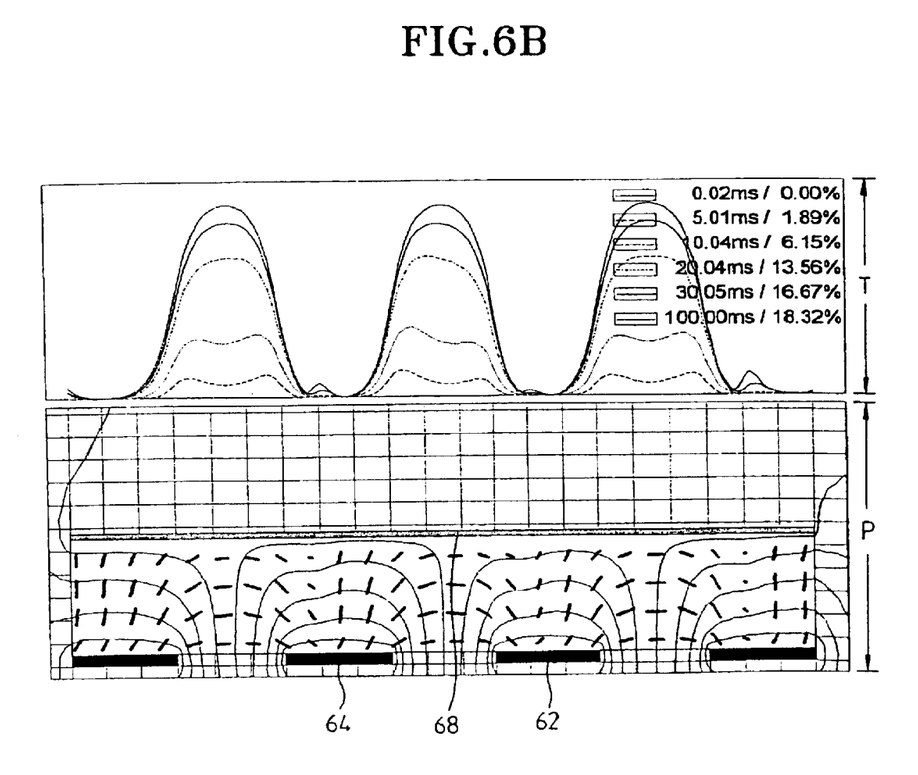
FIG. 6B is a simulation result of the IPS mode LCD according to the fifth embodiment.

FIG. 6B is a simulation result of the LCD according to the fifth embodiment of the present invention. Herein, the high dielectric layer has the dielectric constant of $10^6$. A reference symbol "T" in the drawing stands for the transmittance of the LCD and "P" stands for a section of the LCD.

According to FIG. 6B, since the static electricity in the upper substrate 67 is discharged by the high dielectric layer 68, the liquid crystal molecules are arranged between the counter electrode 62 and the pixel electrode 64 such that long axes of the liquid crystal molecules are disposed parallel to the substrates. That means, the liquid crystal molecules are driven in the normal state not affected by the parasitic electric field but affected by the main electric field thereby preventing defects in the picture quality.

Sixth Embodiment

LCD to Remove Generating Parasitic Electric Field Due to Static Electricity

Figure 7A:
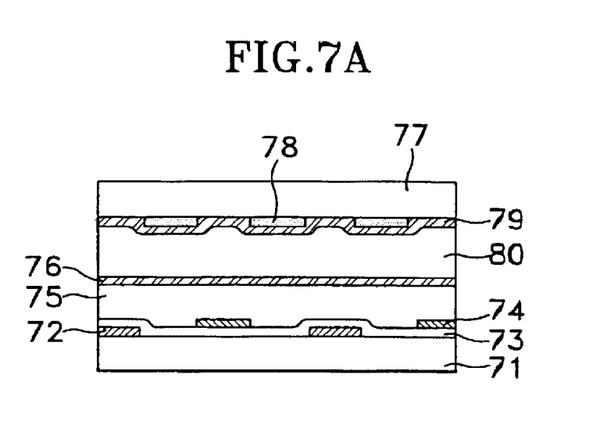
FIG. 7A is a cross-sectional view showing an IPS mode LCD according to a sixth embodiment of the present invention.

Referring to FIG. 7A, counter electrodes 72 are formed on a lower substrate 71. A gate insulating layer 73 is deposited on the lower substrate 71 in which the counter electrodes 72 are formed. Pixel electrodes 74 are formed on the gate insulating layer 73 between the counter electrodes 72. A passivation film 75 is formed on the pixel electrodes 74 and the insulating layer 73. Herein, the passivation film 75 can be made of $SiN_4$ layer. An alignment layer 76 is formed on the passivation film 75.

An upper substrate 77 is opposed to the lower substrate 71 with a selected distance. A high dielectric layer 78 is disposed at an inner surface of the upper substrate 77. At this time, the high dielectric layer 78 is formed in a pattern to correspond with region between the counter and pixel electrodes 72,74. Another alignment layer 79 is formed on the high dielectric layer 78 and the upper substrate 77.

A liquid crystal layer 80 is sandwiched between the lower substrate 71 and the upper substrate 77.

The LCD having the above constitution is operated similar to the fifth embodiment.

Figure 7B:
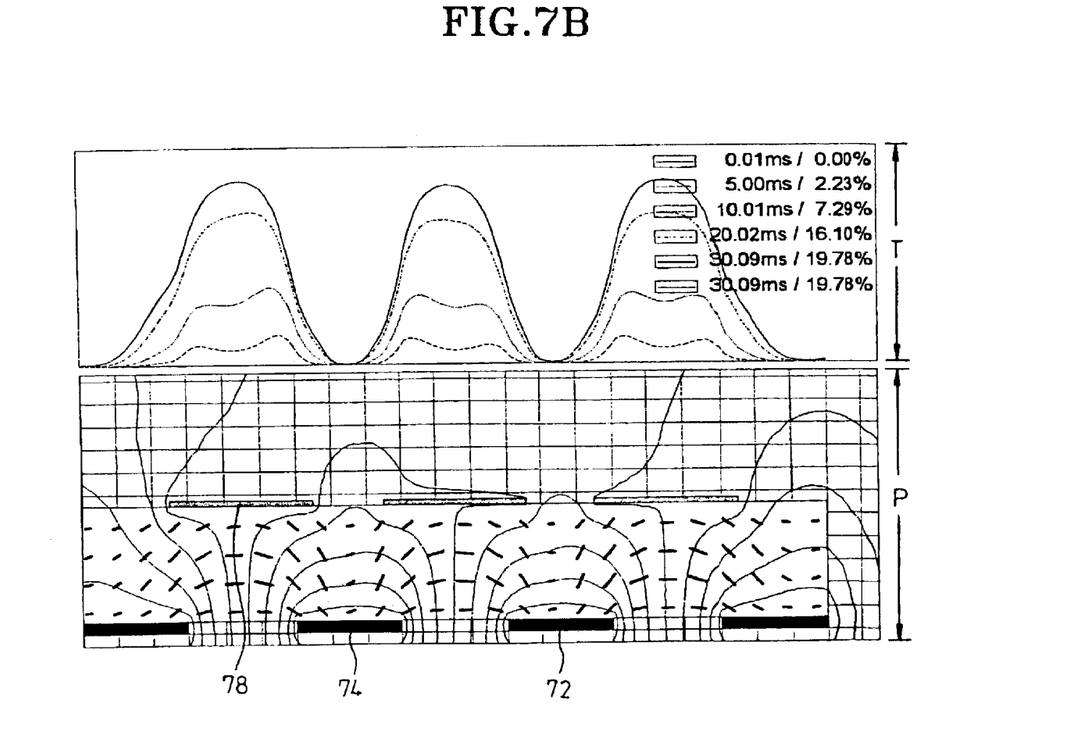
FIG. 7B is a simulation result of the IPS mode LCD according to the sixth embodiment.

FIG. 7B is a simulation result of the LCD according to the sixth embodiment of the present invention. Herein, the high dielectric layer has the dielectric constant of $10^6$. A reference symbol "T" in the drawing stands for the transmittance of the LCD and "P" stands for a section of the LCD.

According to FIG. 7B, since the static electricity in the upper substrate 77 is discharged by the high dielectric layer 78, the liquid crystal molecules are arranged between the counter electrode 72 and the pixel electrode 74 such that long axes of the liquid crystal molecules are disposed parallel to the substrates. That means, the liquid crystal molecules are driven in the normal state not affected by the parasitic electric field but affected by the main electric field thereby preventing defects in the picture quality.

Seventh Embodiment

LCD to Remove Generating Parasitic Electric Field Due to Static Electricity

Figure 8A:
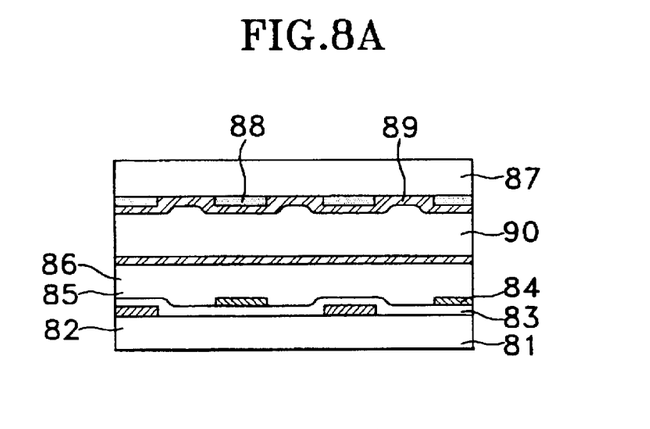
FIG. 8A is a cross-sectional view showing an IPS mode LCD according to a seventh embodiment of the present invention.

Referring to FIG. 8A, counter electrodes 82 are formed on a lower substrate 81. A gate insulating layer 83 is deposited on the lower substrate 81 in which the counter electrodes 82 are formed. Pixel electrodes 84 are formed on the gate insulating layer 83 between the counter electrodes 82. A passivation film 85 is formed on the pixel electrodes 84 and the insulating layer 83. Herein, the passivation film 85 can be made of $SiN_4$ layer. An alignment layer 86 is formed on the passivation film 85.

An upper substrate 87 is opposed to the lower substrate 81 with a selected distance. A high dielectric layer 88 is disposed at an inner surface of the upper substrate 87. At this time, the high dielectric layer 88 is formed in a pattern to correspond with the counter and pixel electrodes 82,84. Another alignment layer 89 is formed on the high dielectric layer 88 and the upper substrate 81.

A liquid crystal layer 90 is sandwiched between the lower substrate 81 and the upper substrate 87.

The LCD having the above constitution is operated similar to the fifth embodiment.

Figure 8B:
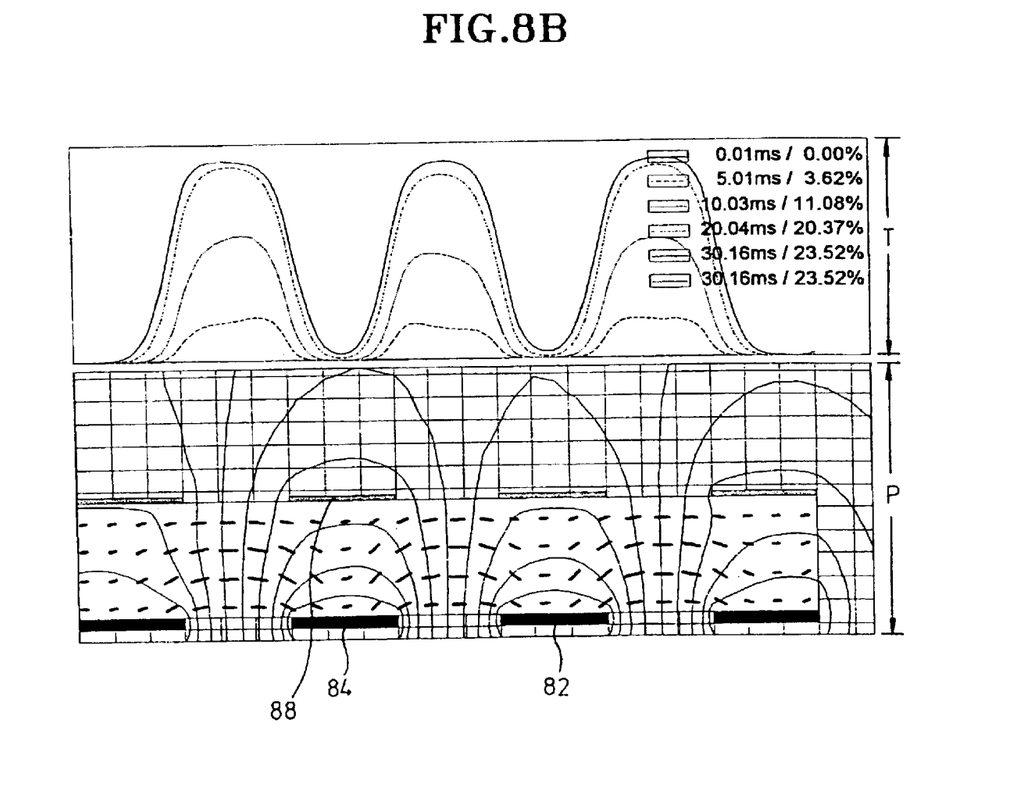
FIG. 8B is a simulation result of the IPS mode LCD according to the seventh embodiment.

FIG. 8B is a simulation result of the LCD according to the seventh embodiment of the present invention. Herein, the high dielectric layer has the dielectric constant of $10^6$. A reference symbol "T" in the drawing stands for the transmittance of the LCD and "P" stands for a section of the LCD.

According to FIG. 8B, since the static electricity in the upper substrate 87 is discharged by the high dielectric layer 88, the liquid crystal molecules are arranged between the counter electrode 82 and the pixel electrode 84 such that long axes of the liquid crystal molecules are disposed parallel to the substrates.

As described in the specification, according to the present invention, a high dielectric alignment layer having a dielectric constant of over 8 is disposed between a substrate in which counter and pixel electrodes are formed, and an alignment layer, thereby reducing residual DC between the counter and pixel electrodes.

As a result, no parasitic electric field is formed in the liquid crystal layer and the voltage holding ratio and response time characteristic are also improved. Further, since the parasitic electric field is prevented, the liquid crystal molecules do not drive in the abnormal state. Consequently, wide viewing angle and enhanced transmittance are obtainable.

Further, the static electricity in the upper substrate is discharged rapidly since the high dielectric layer is formed on the upper substrate opposite to the lower substrate in which the counter and pixel electrodes are formed.

What is claimed is:

1. An in-plane switching (IPS) mode liquid crystal display (LCD) comprising:

a substrate;

counter electrodes formed on the substrate;

pixel electrodes formed on the substrate and spaced apart from the counter electrodes; and a dielectric layer disposed over the counter and pixel electrodes and having a dielectric constant greater than 8.

2. The IPS mode LCD of claim 1, wherein opposing sides of the dielectric layer are overlapped with the counter and pixel electrodes.

3. The IPS mode LCD of claim 1, wherein the dielectric layer is overlapped with the counter electrodes and the pixel electrodes entirely.

4. The IPS mode LCD of claim 1, wherein the dielectric layer has a dielectric constant of $10^6$ approximately.

5. An IPS mode LCD comprising:

a first substrate;

counter electrodes formed on the first substrate;

pixel electrodes formed on the first substrate and spaced apart from the counter electrodes;

a second substrate opposed to the first substrate; and a dielectric layer disposed adjacent an inner surface of the second substrate and having a dielectric constant greater than 8.

6. The IPS mode LCD of claim 5, wherein the dielectric layer is disposed over the second substrate entirely.

7. The IPS mode LCD of claim 5, wherein the dielectric layer is formed at regions to correspond with regions between the counter and pixel electrodes.

8. The IPS mode LCD of claim 5, wherein the dielectric layer is formed at regions to correspond with the counter and pixel electrodes.

9. The IPS mode LCD of claim 5, wherein the dielectric layer has a dielectric constant of $10^6$ approximately.

10. The IPS mode LCD of claim 5, further comprising a second dielectric layer adjacent the first substrate in which the counter and pixel electrodes are formed.

11. The IPS mode LCD of claim 10, wherein the second dielectric layer has a dielectric constant greater than 8.

12. The IPS mode LCD of claim 11, wherein the second dielectric layer has a dielectric constant of $10^6$ approximately.

13. An IPS mode LCD comprising:

a first substrate;

counter electrodes formed on the first substrate;

pixel electrodes formed on the first substrate and spaced apart from the counter electrodes;

a first dielectric layer formed over the counter and pixel electrodes and having a dielectric constant greater than 8;

a second substrate opposed to the first substrate; and a second dielectric layer disposed adjacent an inner surface of the second substrate and having a dielectric constant greater than 8.

14. The IPS mode LCD of claim 13, wherein the first dielectric layer is formed laterally between the counter and pixel electrodes, and over the upper portions of the counter and pixel electrodes.

15. The IPS mode LCD of claim 13, wherein the second dielectric layer is formed over the second substrate entirely.

16. The IPS mode LCD of claim 13, wherein the second dielectric layer is formed at regions to correspond with regions between the counter and pixel electrodes.

17. The IPS mode LCD of claim 13, wherein the second dielectric layer is formed at regions to correspond with the counter and pixel electrodes.

18. The IPS mode LCD of claim 1, wherein the dielectric layer is disposed at a location so as to inhibit the formation of a parasitic electric field in an associated liquid crystal layer.

19. The IPS mode LCD of claim 1, further comprising a gate insulating layer covering the counter electrodes; and a passivation layer formed on the gate insulating layer and covering the pixel electrodes, the dielectric layer being disposed over the passivation layer.

20. The IPS mode LCD of claim 19, wherein the dielectric layer is formed on the passivation layer.

21. An in-plane switching (IPS) mode liquid crystal display (LCD) comprising:

a substrate;

counter electrodes formed on the substrate;

pixel electrodes formed on the substrate and spaced apart from the counter electrodes;

a dielectric layer disposed over the counter and pixel electrodes for inhibiting the formation of a parasitic electric field in the liquid crystal display, the dielectric layer having a dielectric constant greater than 8.

22. The IPS mode LCD of claim 21, further comprising a gate insulating layer covering the counter electrodes; and a passivation layer formed on the gate insulating layer and covering the pixel electrodes, the dielectric layer being disposed over the passivation layer.

23. The IPS mode LCD of claim 22, wherein the dielectric layer is formed on the passivation layer.

* * * * *